United States Patent
Kim et al.

(10) Patent No.: US 10,735,820 B2
(45) Date of Patent: Aug. 4, 2020

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Soo-hong Kim, Seoul (KR); Su-won Shin, Yongin-si (KR); Ki-suk Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/704,180

(22) Filed: Sep. 14, 2017

(65) Prior Publication Data

US 2018/0103299 A1    Apr. 12, 2018

(30) Foreign Application Priority Data

Oct. 10, 2016  (KR) ........................ 10-2016-0130645

(51) Int. Cl.
| | | |
|---|---|---|
| *H04N 21/485* | (2011.01) | |
| *G06T 7/80* | (2017.01) | |
| *G06T 11/00* | (2006.01) | |
| *G06T 7/70* | (2017.01) | |
| *G06T 7/194* | (2017.01) | |

(Continued)

(52) U.S. Cl.
CPC ....... *H04N 21/4854* (2013.01); *G06F 3/0488* (2013.01); *G06F 3/147* (2013.01); *G06T 7/194* (2017.01); *G06T 7/70* (2017.01); *G06T 7/80* (2017.01); *G06T 11/00* (2013.01); *H04N 5/445* (2013.01); *H04N 21/485* (2013.01); *H04N 21/4858* (2013.01); *H04N 21/8153* (2013.01);

(Continued)

(58) Field of Classification Search
None
See application file for complete search history.

(56) References Cited

U.S. PATENT DOCUMENTS

| | | | |
|---|---|---|---|
| 5,532,754 A | 7/1996 | Young et al. | |
| 5,784,498 A | 7/1998 | Venable | |

(Continued)

FOREIGN PATENT DOCUMENTS

| | | | |
|---|---|---|---|
| CN | 104639748 A | 5/2015 | |
| EP | 0772157 A2 | 5/1997 | |

(Continued)

OTHER PUBLICATIONS

International Search Report, issued by International Searching Authority in corresponding International Application No. PCT/KR2017/009962, dated Dec. 27, 2017, (PCT/ISA/210).

(Continued)

*Primary Examiner* — Bernard Krasnic
(74) *Attorney, Agent, or Firm* — Sughrue Mion, PLLC

(57) ABSTRACT

An electronic device and a method for controlling the electronic device are provided. The method includes acquiring an image comprising a guide member positioned in an area at which a display device is to be installed; displaying the acquired image; analyzing a background area of the acquired image, the background area being positioned within the guide member in the acquired image; and acquiring information about a background image that is to be displayed in the background area of the acquired image.

19 Claims, 21 Drawing Sheets

(51) Int. Cl.
*G06F 3/0488* (2013.01)
*G06F 3/147* (2006.01)
*H04N 5/445* (2011.01)
*H04N 21/81* (2011.01)

(52) U.S. Cl.
CPC .............. *G06T 2207/20092* (2013.01); *G06T 2207/30208* (2013.01); *G06T 2207/30244* (2013.01)

(56) References Cited

U.S. PATENT DOCUMENTS

| | | | |
|---|---|---|---|
| 6,529,280 B1 | 3/2003 | Yahashi et al. | |
| 8,437,567 B2 | 5/2013 | Jeong et al. | |
| 9,076,221 B2 | 7/2015 | Xiong et al. | |
| 9,201,467 B2 | 12/2015 | Fujii et al. | |
| 9,390,646 B2 | 7/2016 | Park et al. | |
| 9,392,177 B2 | 7/2016 | Takasumi et al. | |
| 9,857,867 B2 | 1/2018 | Kumar et al. | |
| 9,965,999 B1 | 5/2018 | Barnes | |
| 10,122,969 B1 | 11/2018 | Lim et al. | |
| 2003/0160884 A1 | 8/2003 | Hanson | |
| 2006/0007511 A1 | 1/2006 | Koyama et al. | |
| 2008/0002216 A1 | 1/2008 | Matsushima | |
| 2010/0066712 A1 | 3/2010 | Tomonaga | |
| 2011/0149181 A1 | 6/2011 | Kim et al. | |
| 2012/0013646 A1* | 1/2012 | Ichioka ............... G09G 5/00 345/690 | |
| 2012/0038663 A1 | 2/2012 | Gustafsson et al. | |
| 2012/0120103 A1 | 5/2012 | Border et al. | |
| 2012/0133790 A1 | 5/2012 | Sams | |
| 2012/0188243 A1 | 7/2012 | Fujii et al. | |
| 2013/0265306 A1 | 10/2013 | Landweber | |
| 2014/0063052 A1 | 3/2014 | Choi | |
| 2014/0152706 A1 | 6/2014 | Park et al. | |
| 2014/0204023 A1 | 7/2014 | Kumar et al. | |
| 2014/0232625 A1 | 8/2014 | Murase et al. | |
| 2014/0282159 A1 | 9/2014 | Lee et al. | |
| 2014/0306980 A1 | 10/2014 | Won et al. | |
| 2014/0365912 A1 | 12/2014 | Shaw et al. | |
| 2014/0365919 A1 | 12/2014 | Shaw et al. | |
| 2015/0145887 A1* | 5/2015 | Forutanpour ........... G06F 3/017 345/633 | |
| 2015/0260505 A1* | 9/2015 | Nagano ................. G06T 3/00 348/135 | |
| 2016/0011737 A1 | 1/2016 | Kang et al. | |
| 2016/0035138 A1 | 2/2016 | Kim et al. | |
| 2016/0041721 A1 | 2/2016 | Fujii et al. | |
| 2016/0097935 A1 | 4/2016 | Chien et al. | |
| 2016/0117972 A1 | 4/2016 | Yoshiyama et al. | |
| 2016/0180558 A1 | 6/2016 | Kim | |
| 2017/0357397 A1* | 12/2017 | Masumoto ............ G06F 3/0484 | |
| 2018/0101222 A1 | 4/2018 | Kumar et al. | |
| 2018/0103299 A1 | 4/2018 | Kim et al. | |
| 2018/0164981 A1 | 6/2018 | Park et al. | |
| 2018/0165052 A1 | 6/2018 | Kim et al. | |
| 2018/0174555 A1 | 6/2018 | Lee et al. | |
| 2018/0247613 A1 | 8/2018 | Lee et al. | |
| 2018/0300770 A1* | 10/2018 | Kamel ............... G06Q 30/0276 | |
| 2018/0330697 A1 | 11/2018 | Lee et al. | |
| 2018/0342224 A1 | 11/2018 | Beon et al. | |
| 2019/0011691 A1 | 1/2019 | Peyman | |

FOREIGN PATENT DOCUMENTS

| | | | | |
|---|---|---|---|---|
| EP | 2 128 686 A1 | 12/2009 | | |
| EP | 2 129 084 A1 | 12/2009 | | |
| EP | 3319076 A1 | 5/2018 | | |
| JP | 2006189708 A | * 7/2006 | ............. G06T 13/00 | |
| JP | 2007201580 A | * 8/2007 | ............. H04N 5/64 | |
| JP | 2007324974 A | 12/2007 | | |
| JP | 200921771 A | 1/2009 | | |
| JP | 2010-72141 A | 4/2010 | | |
| JP | 2011180964 A | 9/2011 | | |
| JP | 2012-155556 A | 8/2012 | | |
| JP | 2013168922 A | 8/2013 | | |
| JP | 2014114071 A | 6/2014 | | |
| JP | 2016049998 A | 4/2016 | | |
| KR | 2000-0000145 U | 4/2000 | | |
| KR | 2000-0009068 U | 5/2000 | | |
| KR | 1020090075234 A | 7/2009 | | |
| KR | 10-2012-0063987 A | 6/2012 | | |
| KR | 101222318 B1 | 1/2013 | | |
| KR | 20130006878 A | * 1/2013 | ............... G06T 7/60 | |
| KR | 1020140028558 A | 3/2014 | | |
| KR | 20140060365 A | * 5/2014 | ............. G06T 11/00 | |
| KR | 10-2014-0070120 A | 6/2014 | | |
| KR | 10-2014-0094393 A | 7/2014 | | |
| KR | 10-1495165 B1 | 2/2015 | | |
| KR | 1020150044787 A | 4/2015 | | |
| KR | 1020150054059 A | 5/2015 | | |
| KR | 1020160002461 A | 1/2016 | | |
| KR | 1020160047972 A | 5/2016 | | |
| KR | 10-2016-0074288 A | 6/2016 | | |
| KR | 10-2018-0039394 A | 4/2018 | | |
| KR | 10-2018-0072337 A | 6/2018 | | |
| KR | 10-2018-0074405 A | 7/2018 | | |
| WO | 2015056932 A1 | 4/2015 | | |
| WO | 2015/077591 A1 | 5/2015 | | |
| WO | WO-2016124146 A1 | * 8/2016 | ............. H04N 5/262 | |
| WO | 2017052102 A1 | 3/2017 | | |

OTHER PUBLICATIONS

Written Opinion, issued by International Searching Authority in corresponding International Application No. PCT/KR2017/009962, dated Dec. 27, 2017, (PCT/ISA/237).
Communication dated Feb. 22, 2018, from the European Patent Office in counterpart European Application No. 17191786.7.
Communication dated Jan. 28, 2019 issued by the Korean Intellectual Property Office in counterpart Korean Application No. 10-2016-0130645.
Communication dated Feb. 8, 2019 issued by the European Intellectual Property Office in counterpart European Application No. 17 191 786.7.
Written Opinion dated Mar. 22, 2018 issued by the International Searching Authority in counterpart International Patent Application No. PCT/KR2017/014634 (PCT/ISA/237).
Search Report dated Mar. 22, 2018 issued by the International Searching Authority in counterpart International Patent Application No. PCT/KR2017/014634 (PCT/ISA/210).
Office Action dated Jul. 27, 2018, issued by the United States Patent and Trademark Office in counterpart U.S. Appl. No. 15/840,274.
Office Action dated Jan. 10, 2019, issued by the United States Patent and Trademark Office in counterpart U.S. Appl. No. 15/840,274.
Office Action dated May 22, 2019, issued by the United States Patent and Trademark Office in counterpart U.S. Appl. No. 15/840,274.
Communication dated Jul. 22, 2019, issued by the European Patent Office in counterpart European Application No. 17881422.4.
Communication dated Jun. 13, 2019, issued by the Korean Intellectual Property Office in counterpart Korean Patent Application No. 10-2016-0130645.
Communication dated Oct. 11, 2019 issued by the United States Patent Office in Counterpart U.S. Appl. No. 15/840,274.
International Search Report dated Nov. 19, 2019 issued by the International Searching Authority in counterpart International Application No. PCT/KR2019/009316 (PCT/ISA/210).
Written Opinion dated Nov. 19, 2019 issued by the International Searching Authority in counterpart International Application No. PCT/KR2019/009316 (PCT/ISA/237).
Communication dated Jan. 22, 2020, issued by the European Patent Office in counterpart European Application No. 17191786.7.
Communication dated Feb. 4, 2020, issued by the European Patent Office in counterpart European Application No. 19186608.6.

* cited by examiner

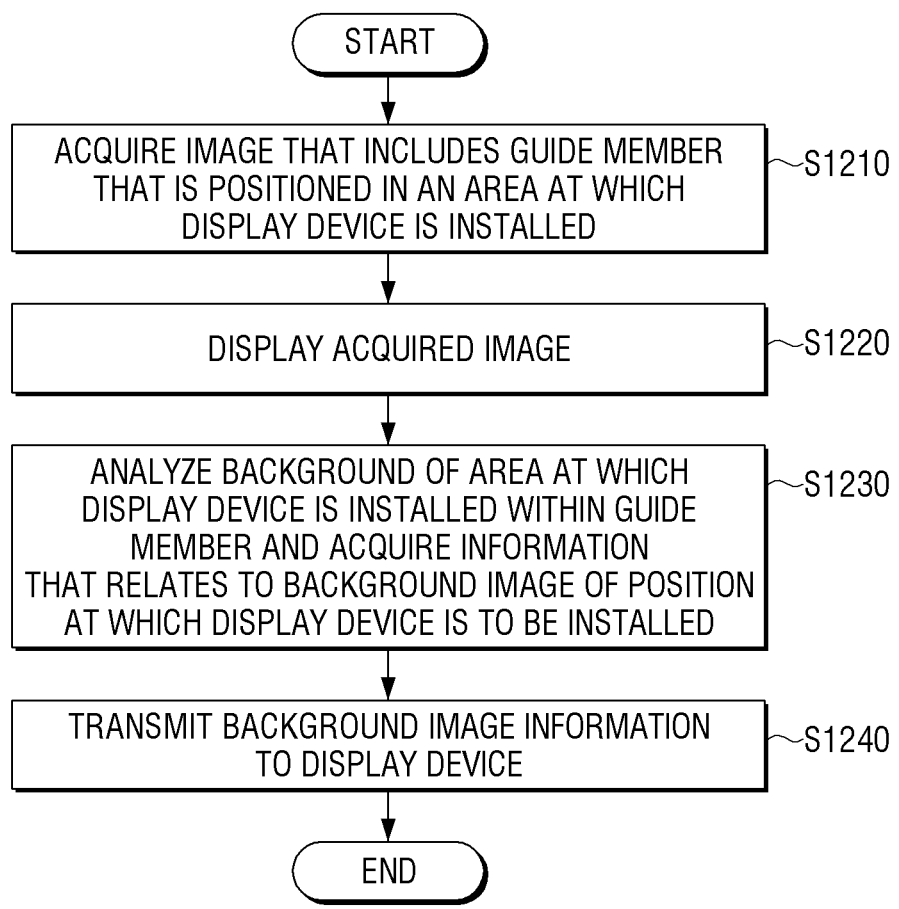

ELECTRONIC DEVICE AND METHOD FOR CONTROLLING THE ELECTRONIC DEVICE

CROSS-REFERENCE TO RELATED APPLICATION

This application claims priority from Korean Patent Application No. 10-2016-0130645, filed in the Korean Intellectual Property Office on Oct. 10, 2016, the disclosure of which is incorporated herein by reference in its entirety.

BACKGROUND

1. Field

Apparatuses and methods consistent with exemplary embodiments relate to an electronic device and a method for controlling the electronic device, and more particularly, to an electronic device and a method for controlling the electronic device for installing an external display device more easily and efficiently and transmitting a background image to a display device.

2. Description of Related Art

In recent years, display devices have been developed to provide various user experiences. For example, a display device may acquire and display a image of the background behind the display device after applying a visual effect to the background image to render a screen of the display device to be a transparent window.

In order to provide such a visual effect, the background image may be photographed in the absence of the display device, and the size and angle of the background image may be adjusted so that the background image of the display device is realistically blended into the actual background.

In this case, a moiré phenomenon and a distortion phenomenon may occur depending on the camera condition at the time of acquiring the background image. In addition, since the display device must be installed in accordance with the background image already obtained in the process of physically installing the display device after acquiring the background image, the installation position of the display device may be restricted. In addition, since the wall mount type display cannot easily correct the installation position of the display device, there may be an inconvenience that the background image should not be generated with a slight error in order to prevent distortion.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an electronic device that may acquire a background image to be displayed on a display device by using a guide member positioned in an area at which the display device is to be installed, and a controlling method thereof.

According to an aspect of another exemplary embodiment, there is provided a method for controlling an electronic device, the method including: acquiring an image including a guide member positioned in an area at which a display device is to be installed; displaying the acquired image; analyzing a background area of the acquired image, the background area being positioned within the guide member in the acquired image; and acquiring information about a background image that is to be displayed in the background area of the acquired image.

A shape of the guide member may correspond to a shape of the display device and the guide member may include a plurality of marks formed in corner areas of the guide member. The displaying may include displaying a plurality of indicators that guides positions of the plurality of marks of the guide member. In response to identifying that the plurality of marks of the guide member are positioned at the plurality of indicators in the acquired image, the analyzing the background area of the acquired image is performed.

The acquiring the information about the background image may include: identifying whether a shape of the guide member included in the acquired image corresponds to the shape of the display device based on any one or any combination of positions and sizes of the plurality of marks included in the acquired image; and in response to the shape of the guide member included in the acquired image corresponding to the shape of the display device, performing the acquiring information about the background image based on the background area of the acquired image.

The acquiring the information about the background image may include: in response to the shape of the guide member included in the acquired image not corresponding to the shape of the display device, processing the acquired image to render the shape of the guide member in the acquired image to correspond to the shape of the display device; and acquiring the information about the background image based on the background area of the acquired image.

The method may further include: in response to the shape of the guide member included in the acquired image not corresponding to the shape of the display device, displaying a guide message that guides a user motion that renders the shape of the guide member in the acquired image to correspond to the shape of the display device.

The guide member may include a color mark that includes a plurality of colors for acquiring color information of the acquired image. The acquiring the information about the background image may include acquiring the information by analyzing a color mark of the guide member in the acquired image. The method may further include adjusting the acquired image based on the information acquired by analyzing the color mark.

The method may further include: replacing a portion of the acquired image that is surrounded by the guide member in the acquired image, with a predetermined image.

The guide member may include a Quick Response (QR) code for installing or executing an application that relates to installing the display device, and the method may further include: in response to the electronic device recognizing the QR code in the acquired image, installing or executing the application.

The method may further include: connecting the electronic device to the display device through the application, and transmitting the acquired information of the background image to the display device.

According to an aspect of another exemplary embodiment, there is provided an electronic device including: a communication interface configured to communicate with a display device; a camera configured to acquire an image that includes a guide member that is positioned in an area at which the display device is to be installed; a display configured to display the acquired image; and a processor configured to analyze a background area of the acquired image, the background area being positioned within the guide member in the acquired image, and acquire information about a background image that is to be displayed in the background area of the acquired image.

A shape of the guide member may correspond to a shape of the display device and the guide member may include a plurality of marks formed in corner areas of the guide member. The processor may be further configured to control the display to display a plurality of indicators that guide positions of the plurality of the guide members, and in response to the plurality of marks of the guide member being positioned at the plurality of indicators in the acquired image, analyze the background area in the acquired image.

The processor may be further configured to identify whether a shape of the guide member included in the acquired image corresponds to the shape of the display device based on any one or any combination of positions and sizes of the plurality of marks in the acquired image, and in response to the shape of the guide member included in the acquired image corresponding to the shape of the display device, acquire the information about the background image based on the background area of the acquired image.

The processor may be further configured, in response to the shape of the guide member included in the acquired image not corresponding to the shape of the display device, process the acquired image to render the shape of the guide member in the acquired image to correspond to the shape of the display device, and acquire the information about the background image based on the background area of the acquired image.

The processor may be further configured to, in response to the shape the guide member included in the acquired image not corresponding to the shape of the display device, control the display to display a guide message that guides a user motion that renders the shape of the guide member in the acquired image to correspond to the shape of the display device.

The guide member may include a color mark that includes a plurality of colors for acquiring color information of the acquired image. The processor may be further configured to acquire the information about the background image by analyzing a color mark of the guide member in the acquired image, and adjust the acquired image based on the information about the background image acquired by analyzing the color mark.

The processor may be further configured to control the display to replace a portion of the acquired image that is surrounded by the guide member in the acquired image with a predetermined image.

The guide member may include a Quick Response (QR) code for installing or executing an application that relates to installing the display device, and the processor may be further configured to, in response to recognizing the QR code within the acquired image, execute or install the application.

The processor may be further configured to control the communication interface to connect the electronic device to the display device according to a user command that is received through the application and control the communication interface to transmit the acquired information about the background image to the display device.

According to an aspect of another exemplary embodiment, there is provided a non-transitory computer readable storage medium storing a program that is executable by a computer to perform a method for controlling an electronic device, the method including: acquiring an image that includes a guide member installed in an area at which a display device is to be installed; displaying the acquired image; analyzing a background area of the acquired image, the background area being positioned within the guide member in the acquired image; and acquiring information about a background image that is to be displayed in the background area of the acquired image.

According to an aspect of another exemplary embodiment, there is provided anon-transitory computer readable storage medium storing a program that is executable by a computer to perform a method for controlling an electronic device, the method including: acquiring an image of a guide member that positioned in an area in which a display device is to be mounted; identifying whether a ratio of the image corresponds to a ratio of the display device; displaying, in the image, at least one indicator that indicates a boundary of the display device, in response to identifying that the ratio of the first image corresponds to the ratio of the display device; identifying whether at least one corner of the image is positioned within the at least one indicator; and performing an image processing on the image of the guide member in response to identifying that the at least one corner of the image is positioned within the at least one indicator.

The performing the image processing may further include replacing the image of the guide member with a translucent image that displays an area behind the display device.

The at least one indicator may include four indicators that indicate four corner locations of the display device, and the at least one corner of the image may include four corners of the image. The performing the image processing may include performing the image processing in response to identifying that the four corners of the image are positioned within the four indicators.

According to the exemplary embodiments, the user may be provided with an optical illusion effect such as a transparent or a semitransparent display device without distortion. In addition, the user may install the display device at a desired location using the distortion-free optical illusion effect.

BRIEF DESCRIPTION OF THE DRAWINGS

The above and/or other aspects will be more apparent by describing certain exemplary embodiments, with reference to the accompanying drawings, in which:

FIG. 12 is a flowchart illustrating a method of controlling an electronic device used for installing a display device according to an exemplary embodiment.

DETAILED DESCRIPTION

Figure 1:
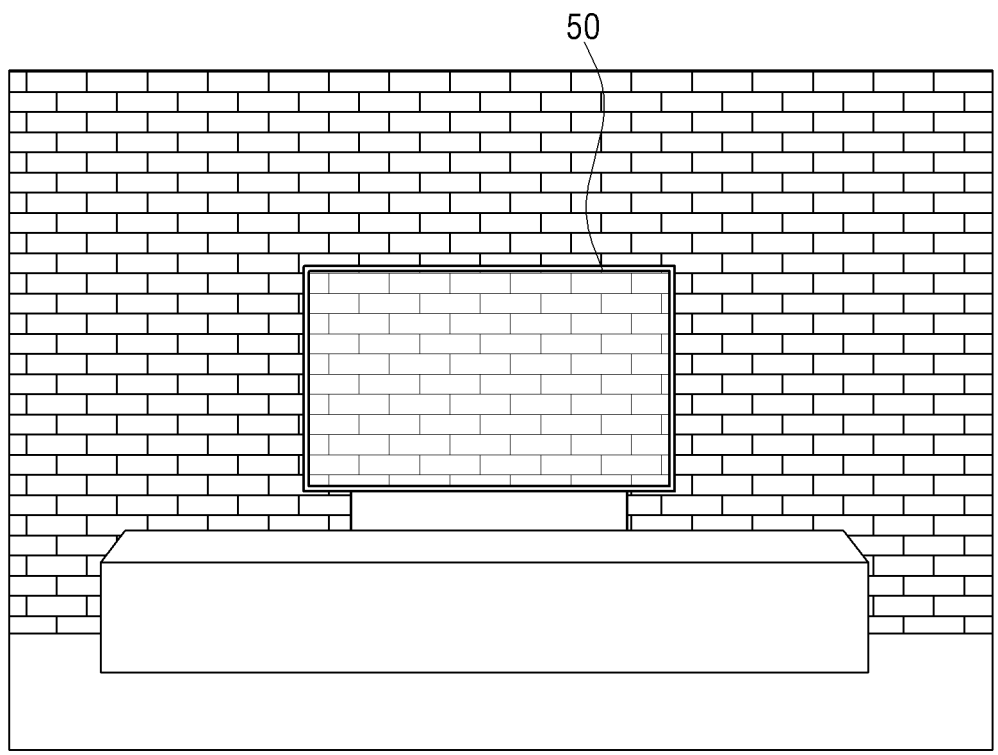
FIG. 1 illustrates an image effect that renders an image of a display device changed to be a transparent window, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the present disclosure, relational terms such as first and second, and the like, may be used to distinguish one entity from another entity, without necessarily implying any actual relationship or order between such entities. exemplary embodiment It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

According to exemplary embodiments, a "module" or "unit" performs at least one function or operation, and may be implemented as hardware (e.g., processor or integrated circuit) or software, or a combination of hardware and software. In addition, a plurality of 'modules' or a plurality of 'units' may be integrated into at least one module and may be realized as at least one processor except for 'modules' or 'units' that should be realized in a specific hardware.

Throughout the exemplary embodiments, when a certain portion is stated as being "connected" with another, this means that the portion may not only be "directly connected", but may also be "electrically connected" while another element intervenes therebetween. In addition, the term "connected" means that a portion is "physically connected" as well as "wirelessly connected". Further, when a certain portion is stated as "comprising" a certain element, unless otherwise stated, this means that the certain portion may include another element, rather than foreclosing the same.

FIG. 1 illustrates an image effect that renders an image of a display device 50 changed to be a transparent window, according to an exemplary embodiment. An electronic device may capture the image of the display device 50 and may perform an image processing to change the captured image of the display device 50 to a transparent or translucent window through which the background behind the display device 50 is shown.

Figure 2:
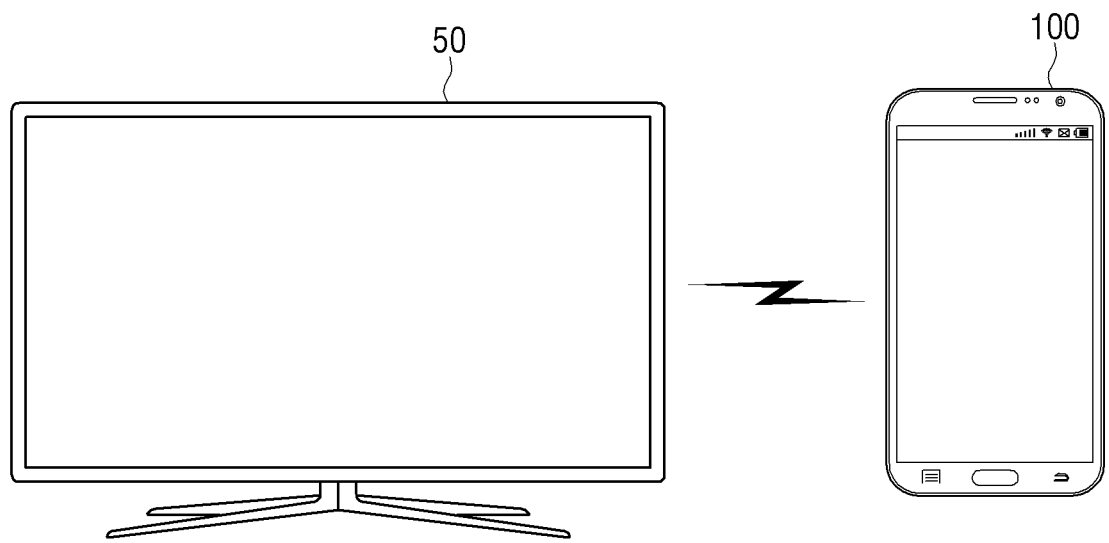
FIG. 2 is a diagram illustrating a system for installing a display device that provides an image effect of FIG. 1 according to an exemplary embodiment.

FIG. 2 is a diagram illustrating a system 10 for installing a display device 50 that provides an image effect of FIG. 1 according to an exemplary embodiment. As illustrated in FIG. 2, the system 10 for installing the display device 50 may include the display device 50 and an electronic device 100. The display device 50 may be a digital television (TV), but is not limited thereto. In particular, the display device 100 may be realized as various types of display devices such as a desktop personal computer (PC), a kiosk, and the like. The electronic device 100 may be realized as a smartphone, but is not limited thereto. In particular, the electronic device 100 may be realized as any of various types of electronic devices such as a remote controller, a personal digital assistant (PDA), a tablet PC, a notebook PC, and the like.

The system 10 may include a guide member that is used for installing the display device 50. The guide member may have the approximate size of the display device 50 to guide a position at which the display device 50 is to be installed. For example, the guide member may be a sheet of paper or cardboard that has substantially the same size and shape as the display device 50. The guide member may include various marks to provide reference points for applying an image effect (hereinafter referred to as "glass window effect") of FIG. 1 to the display device 50.

A user may fix a guide member to a position (e.g., a wall) at which the display device 50 is to be installed.

Once the guide member is fixed, the electronic device 100 may acquire an image that includes a guide member positioned in an area at which the display device 500 is to be installed by using a camera. In addition, the electronic device 100 may display the acquired image. In this case, the displayed image may include a plurality of indicators that guide positions of marks of a guide member to acquire an optimal background image.

In addition, the electronic device 100 may, among photographed images, analyze a background of an area (e.g., wall area) at which the display device 50 is positioned within a guide member, and acquire information that relates to a background image of a position at which the display device 50 is installed. In this case, a background image is an image of an area (e.g., a wall) at which the electronic device 100 is to be installed, and when a background image is displayed on the display device 50, a user can be provided with a glass window effect through the display device 50.

For example, when a plurality of marks of a guide member among images photographed based on the movement of the electronic device 100 are positioned on the plurality of indicators, the electronic device 100 may, among the photographed images, analyze a background of an area at which the display device 50 is positioned within the guide member and acquire information that relates to the background image.

Then, the electronic device 100 may transmit the information that relates to the background image to the display device 50.

In addition, the display device 500 may display the background image acquired from the electronic device 100 and provide a glass window effect. In particular, the display device 50 may process the background image based on information that relates to the background image and color information (or white balance information, etc.). In addition, the display device 500 may provide a glass window effect based on a background image and various information, such as information of, time, weather, and the like.

Figure 3:
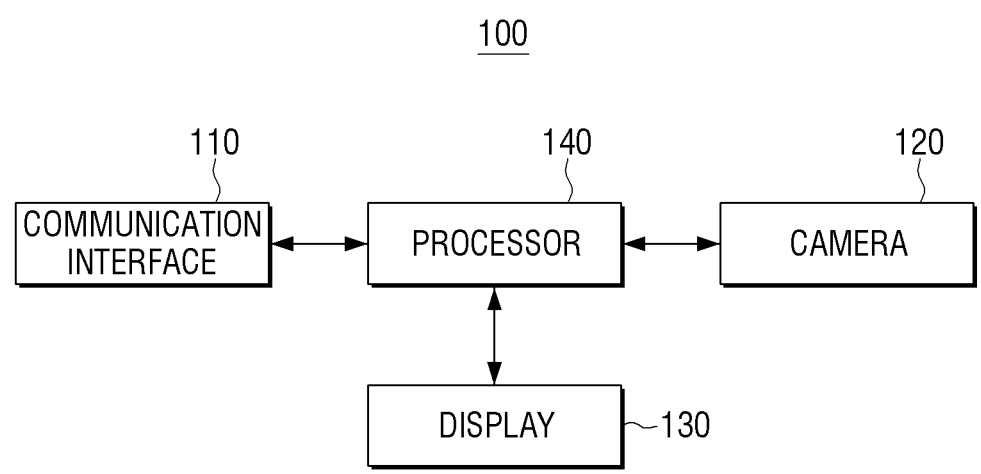
FIG. 3 is a block diagram illustrating a configuration of an electronic device that is used for installing a display device according to an exemplary embodiment.

FIG. 3 is a block diagram illustrating a configuration of an electronic device that is used for installing a display device 50 that provides a glass window effect. As illustrated in FIG. 3, the electronic device 100 may include a communication interface 110, a camera 120, a display 130, and a processor 140. The electronic device 100 may be realized as a smartphone as mentioned above, but is not limited thereto. That is, the electronic device 100 may be realized as any of various types of portable terminals such as a PDA, a remote controller, a tablet PC, a notebook PC, and the like.

The communication interface 110 may be configured to communicate with various external devices. In particular, the communication interface 110 may communicate with the display device 50 and transmit a background image of an area at which the display device 50 is to be positioned to the display device 50. In addition, the communication interface 110 may download, from an external server, an application that is used when the display device 50 is installed.

The camera 120 may be disposed at a rear surface (i.e., the opposite surface to a surface at which the display 130 is arranged) of the electronic device 100, and may be configured to photograph an image. In particular, the camera 120 may acquire images that include a guide member. In this case, the camera 120 may include a lens and an image sensor.

The display 130 may output image data. In particular, the display 130 may be configured to display an image (i.e., an image that includes a guide member) photographed by the camera 120. The display 130 may display a plurality of indicators that guide positions of marks of a guide member in order to acquire an optimal background image on an image that includes a guide member.

The processor 140 may be configured to control overall operations of the electronic device 100. In addition, the processor 140 may analyze a background of an area at which the display device 50 is to be positioned within a guide member among images photographed by the camera 120 to acquire information that relates to a background image of a position at which the display device 50 is installed, and control the communication interface 110 to transmit information that relates to the background image to the display device 50.

For example, when a plurality of marks of a guide member among images photographed based on the movement of the electronic device 100 are positioned on the plurality of indicators, the processor 140 may analyze, among the photographed images, a background (e.g., wallpaper, etc.) of an area at which the display device 50 is to be positioned within the guide member. In particular, the processor 140 may identify whether a guide member included in a photographed image corresponds to a shape of the display device 50 based on any one or any combination of positions and sizes of a plurality of marks included in the photographed images.

In addition, when the guide member included in the photographed image corresponds to the shape of the display device 50, the processor 140 may acquire information that relates to the background image by using a background of an area at which the display device is to be positioned within the guide member.

However, when the guide member included in the photographed image fails to correspond to the shape of the display device 50, the processor 140 may process the photographed image so that the guide member in the photographed image corresponds to the shape of the display device 50, and acquire information that relates to the background image by using a background of an area at which the display device 50 is to be positioned within a guide member of the processed image. Alternatively, when the guide member included in the photographed image fails to correspond to the shape of the display device 50, the processor 140 may control the display 130 to display a guide message guiding a motion of the user so that the guide member within the photographed image corresponds to the shape of the display device 50.

In addition, the processor 140 may analyze a color mark of a guide member in the photographed image to acquire information to adjust the acquired image. For example, the processor 140 may analyze a color mark of the guide member to acquire color information that relates to a background of an area at which the display device 100 is to be positioned within the guide member or white balance information obtained by analyzing color information. In addition, the processor 140 may control the communication interface 110 to transmit, to the display device 50, white balance information along with information that relates to a background image. Accordingly, the electronic device 100 may acquire more accurate information of the color of the area where the guide member is positioned.

In addition, the processor 140 may control the display 130 to synthesize a predetermined image with an area at which the display device 50 is to be installed within the guide member among the photographed images and display the synthesized image. Accordingly, the user may identify, in advance, how the image is displayed by the display device 50 when the display device 50 is installed.

In addition, the processor 140 may install or execute an application based on a quick response (QR) code included in a guide member or attached to the guide member. The QR code may be a two-dimensional matrix-type barcode and may be optically readable by a bar code reader. The QR code may contain information about the display device 50. The processor 140 may control the communication interface 110 to connect the electronic device 100 to the display device 50 according to a user command input through the application.

Figure 4:
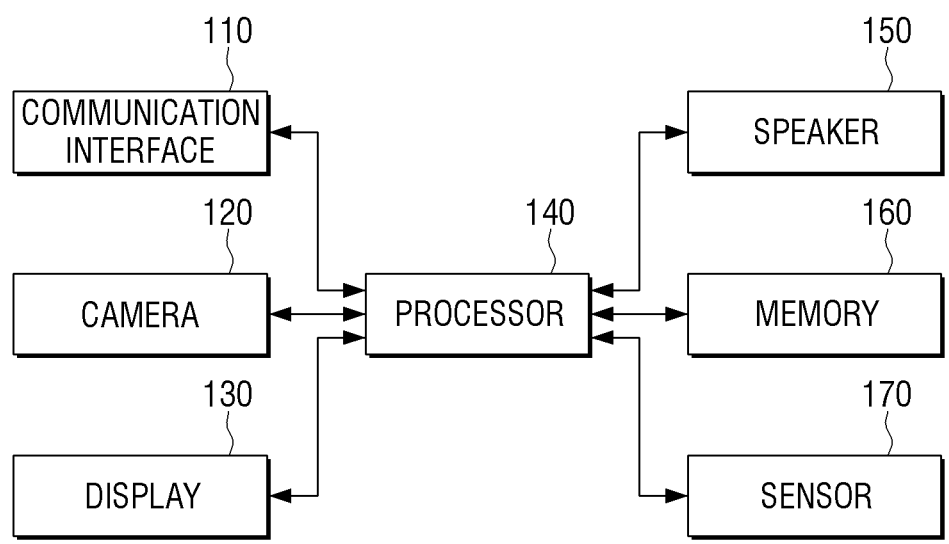
FIG. 4 is a block diagram illustrating a configuration of an electronic device that is used for installing a display device according to another exemplary embodiment.

FIG. 4 is a detailed block diagram illustrating a configuration of the electronic device 100 used for installing a display device that provides a glass window effect. As illustrated in FIG. 4, the electronic device 100 includes a communication interface 110, a camera 120, a display 130, a speaker 150, a memory 160, a sensor 170, and a processor 140. Meanwhile, the elements of the electronic device 100 illustrated in FIG. 4 is merely exemplary, and may not be necessarily limited to the block diagram described above. Thus, one or more of the elements of the electronic device 100 illustrated in FIG. 4 may be omitted or modified, or one or more elements may be added to the electronic device 100.

The communication interface 110 performs communication with a display device 50 or an external server. In particular, the communication interface 110 may include an RF communication module, a bluetooth (BT) communication module, a WiFi communication module, and an infrared ray (IR) communication module, and each communication module may be realized as a connectivity chip, a circuitry, a communication interface, and the like.

The RF communication module may receive a radio frequency (RF) signal among various radio frequency identification (RFID) frequency bands, such as 135 kHz, 13.56 MHz, 433 MHz, 860-960 MHz, 2.45 GHz, and the like. The BT communication module and the WiFi communication module may transmit and receive various kinds of connection information such as a subsystem identification (SSID), a session key and the like is transmitted and received first, and establishes communication, and then, transmit and receive various information. In particular, the electronic device 100 may perform communication with the display device 50 by using the BT communication module or the WiFi communication module. In this case, one or more Bluetooth chips or the WiFi chips may be included. In addition, the communication interface 110 may communicate with an external device through various communication modules, such as ZigBee communication module and near field communication (NFC) module.

Meanwhile, the communication interface 110 may communicate with the display device 50 by using the first communication module (e.g., BT communication module), and communicate with an external server by using a second communication module (e.g., WiFi communication module). However, this is only an example, and the communication interface 110 may communicate with the display device 50 or an external server by using the same type of communication module.

The camera 120 photographs an image. In particular, the camera 120 may photograph a guide member used when the display device 50 is installed, and acquire an image that includes the guide member. In this case, the camera 120 may be a dual camera having a plurality of camera modules, but the example is not limited thereto, and one camera module may be provided in the dual camera. In addition, the camera 120 may be disposed on the opposite side of a surface at which the display 130 is disposed, and thereby a user can view a photographed image while photographing an image.

The display 130 displays various image data and a user interface (UI). In particular, the display 130 may display a plurality of indicators that guide positions of marks of a guide member in order to acquire an optimal background image along with an image photographed by the camera 120.

In accordance with one exemplary embodiment, the display 130 may be combined with a touch sensor and be realized as a touch screen, and may be disposed in at least two areas of a front area, a side area, and a rear area of the electronic device 100 in the form of a flexible display. Due to a substrate as thin and flexible as a paper sheet, the flexible display may have such characteristic that it can be bent, curved, or rolled without being damaged.

The speaker 150 may include various audio output circuitry and is configured to output various kinds of alarm sounds or voice messages in addition to various audio data on which various processing operations such as decoding, amplification, and noise filtering are performed by an audio processor. In accordance with another exemplary embodiment, the speaker 150 may provide a guide message in an audio format when the display device 50 is installed.

The memory 160 stores various modules to drive the electronic apparatus 100. For example, software that includes a base module, a sensing module, a communication module, a presentation module, a web browser module, and a service module, or the like, may be stored on the memory 160. The base module may process signals transferred from each hardware included in the electronic apparatus 100 and may transfer the processed signals to an upper layer module. The sensing module may collect information from various sensors and may analyze and manage the collected information. The sensing module may include a face recognizing module, an audio recognizing module, a motion recognizing module, an NFC recognizing module, and the like. The presentation module may configure a display screen and may include a multimedia module for playing and outputting multimedia contents and a UI rendering module for performing UI and graphic processing. The communication module may perform communication with external devices. The web browser module may perform web browsing to access a web server. The service module may include various applications to provide various services.

As described above, the memory 160 may include various types of program modules, and some of the various types of program modules may be omitted, modified, or added according to a type and a characteristic of the electronic apparatus 100.

The storage 160 may store information that relates to an application being used when the display device 50 is installed.

The sensor 170 may be implemented as various sensors for sensing a user command. The sensor 170 may include a touch sensor. The sensor 170 may sense various information by using various sensors. For example, the sensor 170 may sense motion information by using a motion sensor (e.g., acceleration sensor, gyro sensor, terrestrial magnetism sensor, etc.).

The processor 140 may be configured to control overall operations of the electronic device 100. In addition, the processor 140 may analyze a background of an area at which the display device 50 is to be installed within a guide member among photographed images to acquire information that relates to a background image of a position at which the display device 50 is installed, and control the communication interface 110 to transmit information that relates to the background image to the display device 50.

Exemplary embodiments will be described in greater detail below by referring to FIGS. 5A to 11D.

Figure 5A:
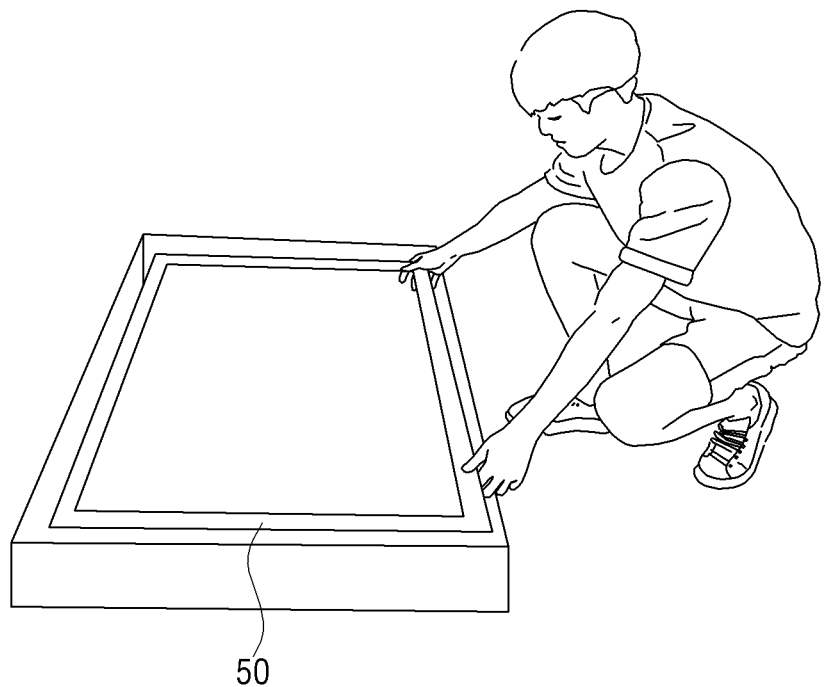
FIGS. 5A, 5B, 5C, 6A, 6B, 7A, 7B, 7C, 7D, 8-10, 11A, 11B, 11C, and 11D illustrate diagrams for installing a display device which provides an image effect of FIG. 1 by using an electronic device, according to an exemplary embodiment.

As shown in FIG. 5A, a user may open a box that includes a display device 50 to install or mount the display 50. A guide member 510 for guiding installation of the display device 50 may be enclosed in the box together with the display device 50.

Figure 5B:
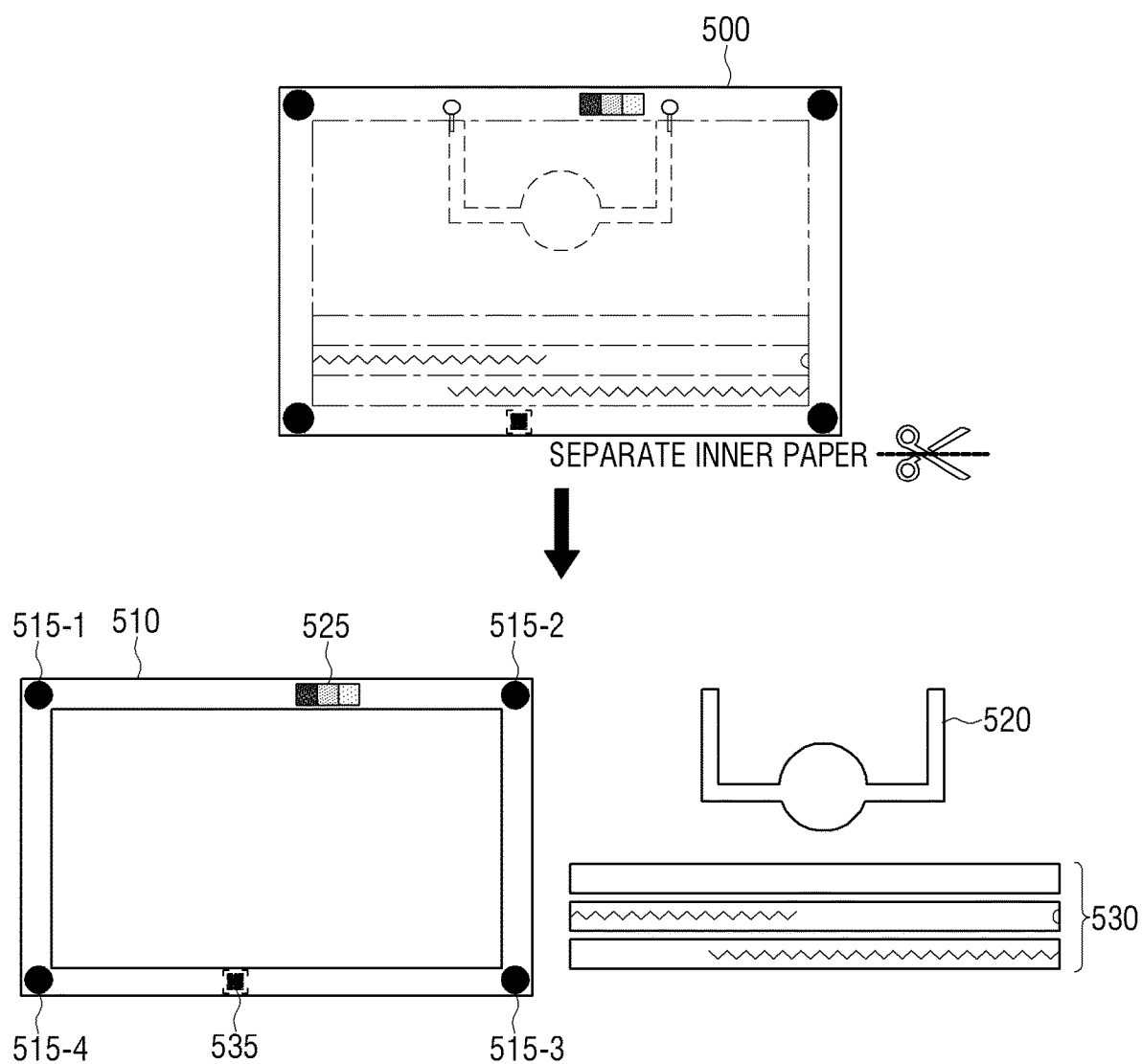

For example, the box that includes the display device 50 may be provided with inner paper 500 as illustrated in the upper part of FIG. 5B. The inner paper 500 may include a guide member 510 for guiding an area at which the display device 50 is to be installed, a member 520 for guiding installation of a wall mount, and a member 530 for guiding a photographing distance.

The inner paper 500 may be separated, by scissors, into the guide member 510, the member 520 for guiding installation of a wall mount, and the member 530 for guiding a photographing distance. However, this is merely an example, and the inner paper 500 may include a sheath at the edges of the guide member 510, the member 520 for guiding installation of a wall mount and the member 530 for guiding a photographing distance.

In particular, the guide member 510 may correspond to the display device 50 in terms of a shape (e.g., rectangle) and a size, and may be in the form of a frame that surrounds an empty space to photograph a background of an area at which the display device 50 is to be installed. In addition, the guide member 510 may include a plurality of marks 515-1 to 515-4, a color mark 525 and a QR code 535. Further, the guide member 510 may include an attachment portion (e.g., double-sided tape or the like) to be fixed to the wall.

The plurality of marks 515-1 to 515-4 may indicate an optimal condition for the electronic device 100 to photograph the guide member 510, and a total of four marks may be provided in the corner areas. However, this is only an example, and five or more marks may be included in the guide member 510. For example, in addition to the four marks located in the corner areas, four marks may be further provided in the middle of the upper, lower, left and right sides.

The color mark 525 is to identify an accurate color of an area within the guide member 510, and may be realized as a grayscale card that includes black, gray and white. The electronic device 100 may photograph and analyze the color mark 525. The electronic device 100 may acquire, based on the analyzed color mark 525, color information of a background of an area at which the display device 50 is to be located within the guide member 510, and may acquire white balance information based on the color information.

The QR code 535 may include download information (e.g., address at which an application for installing the display device 50 is provided) or execution information of an application (hereinafter referred to as "installation application") used when the display device 50 is installed. In this case, the QR code 535 is merely an example and may be realized in different forms such as a bar code.

The member 520 for guiding installation of a wall mount may be connected to the guide member 510 after the guide member 510 is fixed to the wall, and guide a position of a screw used to fix the display device 50 to the wall.

The member 530 for guiding a photographing distance may be disposed on the floor and guide a photographing distance for the user to photograph the guide member using the electronic device 100.

Figure 5C:
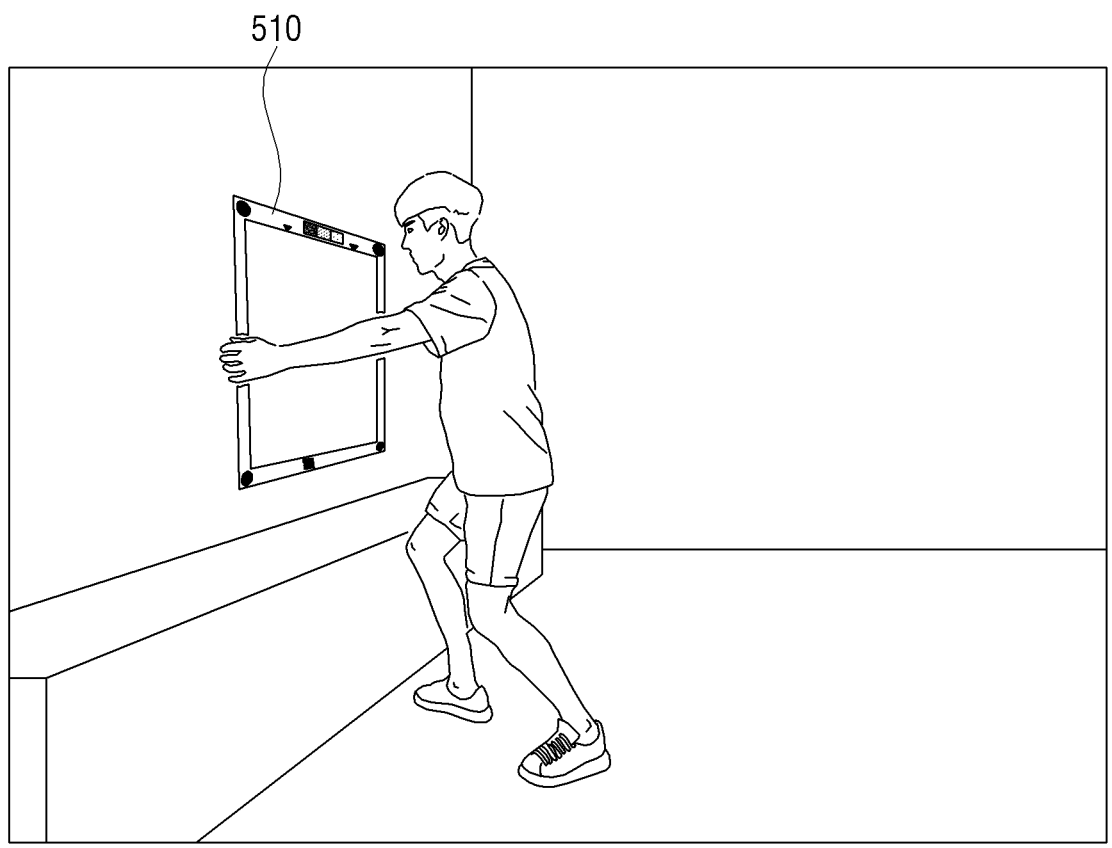

In addition, as illustrated in FIG. 5C, the user may fix the separated guide member 510 to a location (e.g., wall) at which the display device 50 is to be installed. That is, the guide member 510 may be fixed to an area at which the user desires to install the display device 50.

Figure 6A:
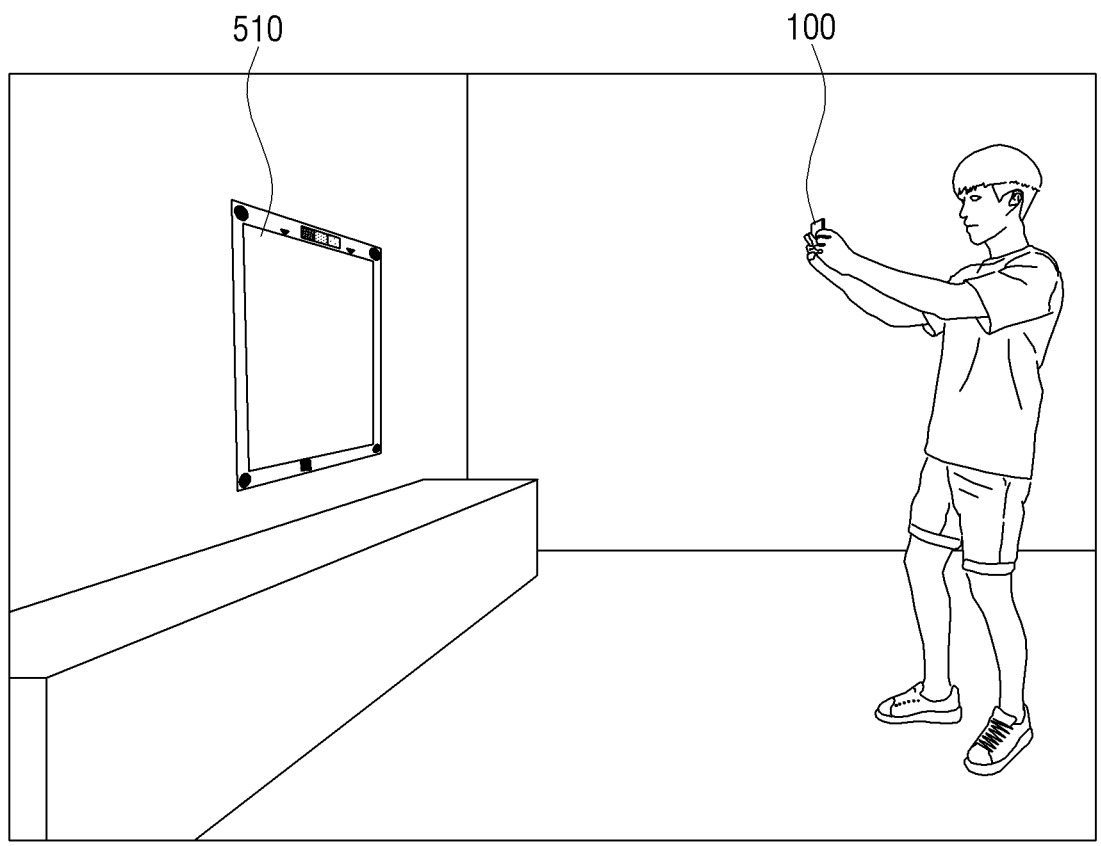

In addition, as illustrated in FIG. 6A, the electronic device 100 may photograph the guide member 510 fixed to the location at which the display device 50 is to be installed.

Figure 6B:
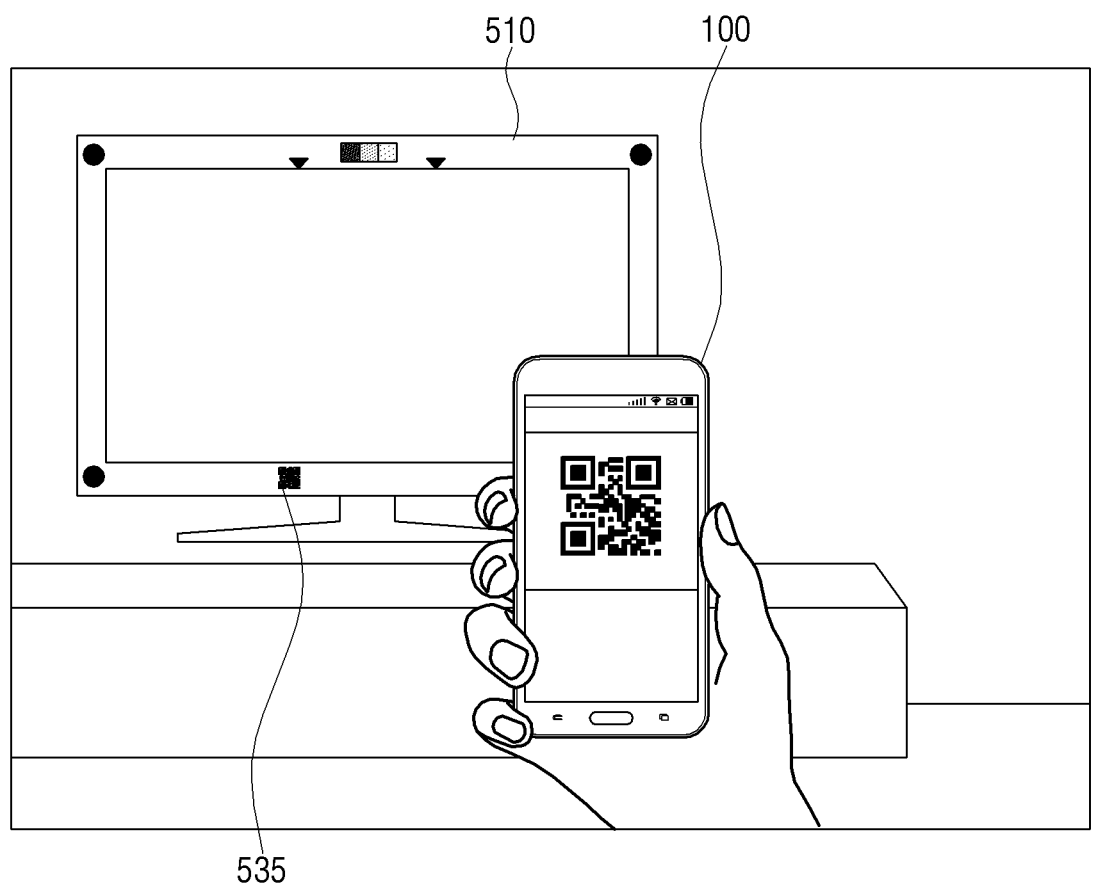

In addition, as illustrated in FIG. 6B, the electronic device 100 may photograph a QR code 535 disposed in the lower end of the guide member 510. When the QR code is recognized, the electronic device 100 may acquire download information of an installation application based on the recognized QR code. In addition, the electronic device 100 may display a screen for downloading the installation application based on the download information of the installation application. In addition, after the screen for downloading the installation application is displayed, the electronic device 100 may download the installation application according to a user command. However, when the installation application has already been downloaded, the electronic device 100 may immediately execute the installation application.

Figure 7A:
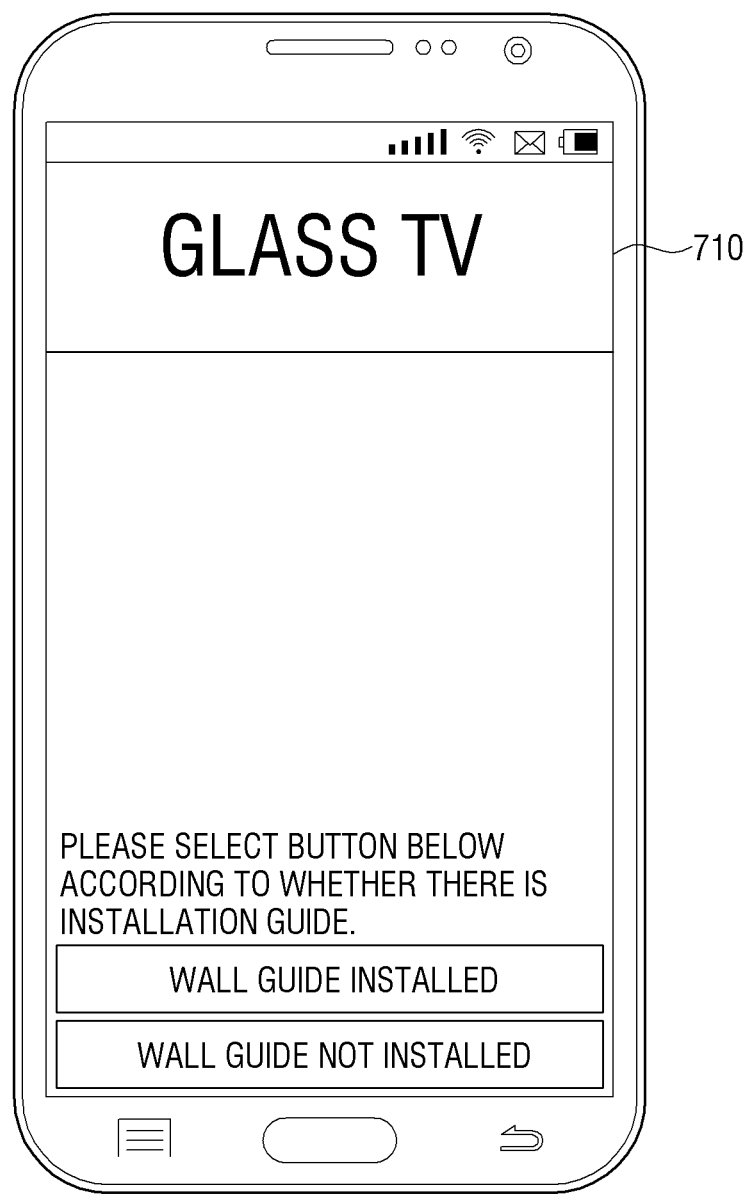

When the installation application is executed, the electronic device 100 may display an execution screen 710 of the installation application as illustrated in FIG. 7A. In particular, the execution screen 710 of the installation application may include a message asking whether the guide member 510 is installed on the wall. If a menu indicating that the guide member 510 is not installed on the wall is selected, the electronic device 100 may display a message to install the guide member 510 on the wall.

Figure 7B:
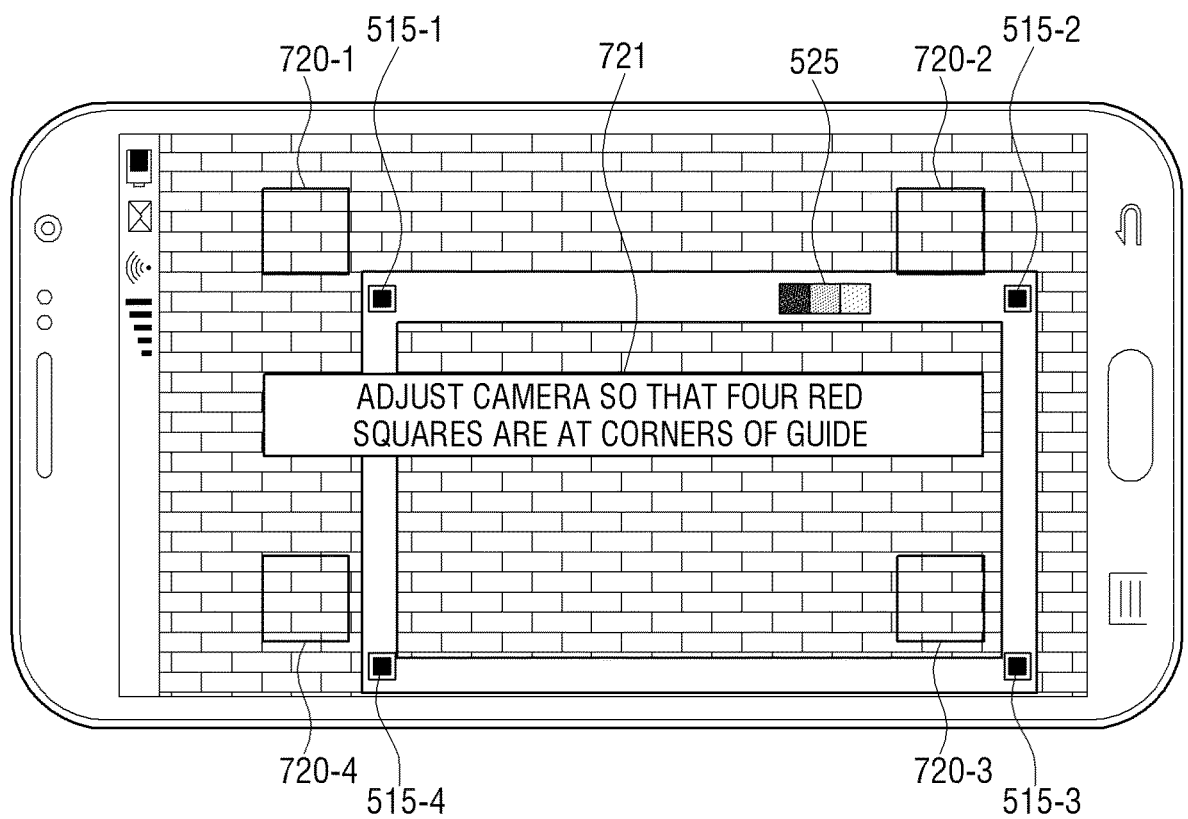

If a menu indicating that the guide member 510 is installed on the wall, the electronic device 100 may display a plurality of indicators 720-1 to 720-4 on the photographed image as illustrated in FIG. 7B. The indicators 720-1 to 720-4 may be indicators that guide positions of the marks within the guide member 510 for guiding an optimal background image, and the positions and number of the indicators 720-1 to 720-4 may correspond to those of the marks. For example, if the number of marks 515-1 to 515-4 is four, the number of indicators 720-1 to 720-4 may be four. In addition, if the marks 515-1 to 515-4 are located at the corners, the indicators 720-1 to 720-4 may be positioned in the corners of a virtual rectangle, respectively. In addition, the sizes of the indicators 720-1 to 720-4 may be larger than those of the marks 515-1 to 515-4.

Further, as illustrated in FIG. 7B, the electronic device 100 may display a message 721 guiding the plurality of marks 515-1 to 515-4 to be positioned within the plurality of indicators 720-1 to 720-4, respectively.

Figure 7C:
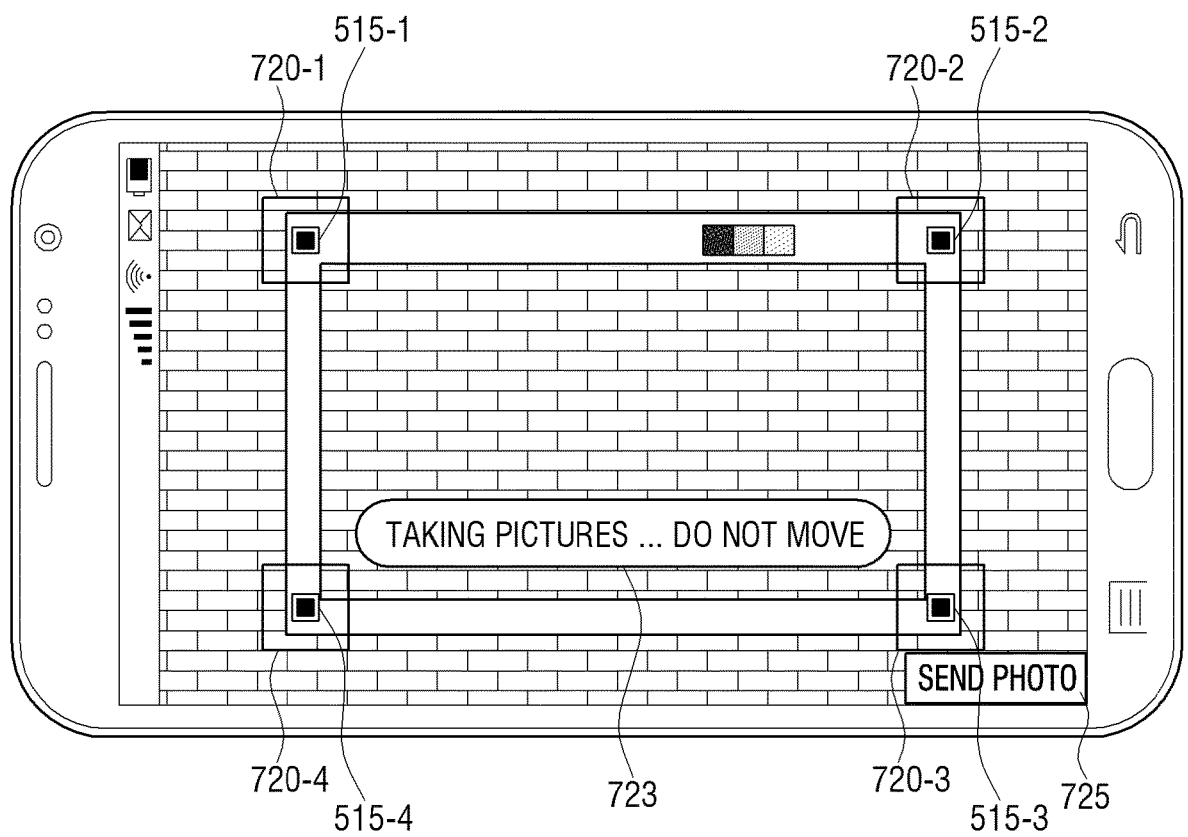

In addition, as illustrated in FIG. 7C, when the plurality of marks 515-1 to 515-4 are positioned in the plurality of indicators according to movement of the electronic device 50, the electronic device 10 may analyze an area of the photographed image at which the guide member 510 is positioned. When the plurality of marks 515-1 to 515-4 are positioned in the plurality of indicators, as illustrated in FIG. 7C, the electronic device 100 may display a message 723 for limiting movement of the user during acquisition of an image and an icon 725 for receiving a user command for transmitting a background image to the display device 50.

In particular, the electronic device 100 may determine whether a shape of the guide member 510 included in the photographed image corresponds to a shape of the display device 50 based on any one or any combination of positions and sizes of the plurality of marks 515-1 to 515-4 included in the photographed image. For example, a shape of the display device 50 is a rectangular shape with a 16:9 ratio, the electronic device 100 may analyze at least one of the positions and sizes of the plurality of marks 515-1 to 515-4 included in the photographed image, and determine whether a shape of the guide member 510 (e.g., a shape formed by a line connecting the plurality of marks 515-1 to 515-4) is a rectangular shape with a 16:9 ratio.

When a shape of the guide member 510 within the photographed image corresponds to that of the display device 50, the electronic device 100 may acquire a background image by using an area at which the guide member 510 is positioned. For example, when the guide member 510 within the photographed image is a rectangular shape with a 16:9 ratio, the electronic device 100 may acquire a background image based on a background of an area at which the display device 510 is to be positioned within the guide member 510.

Figure 8:
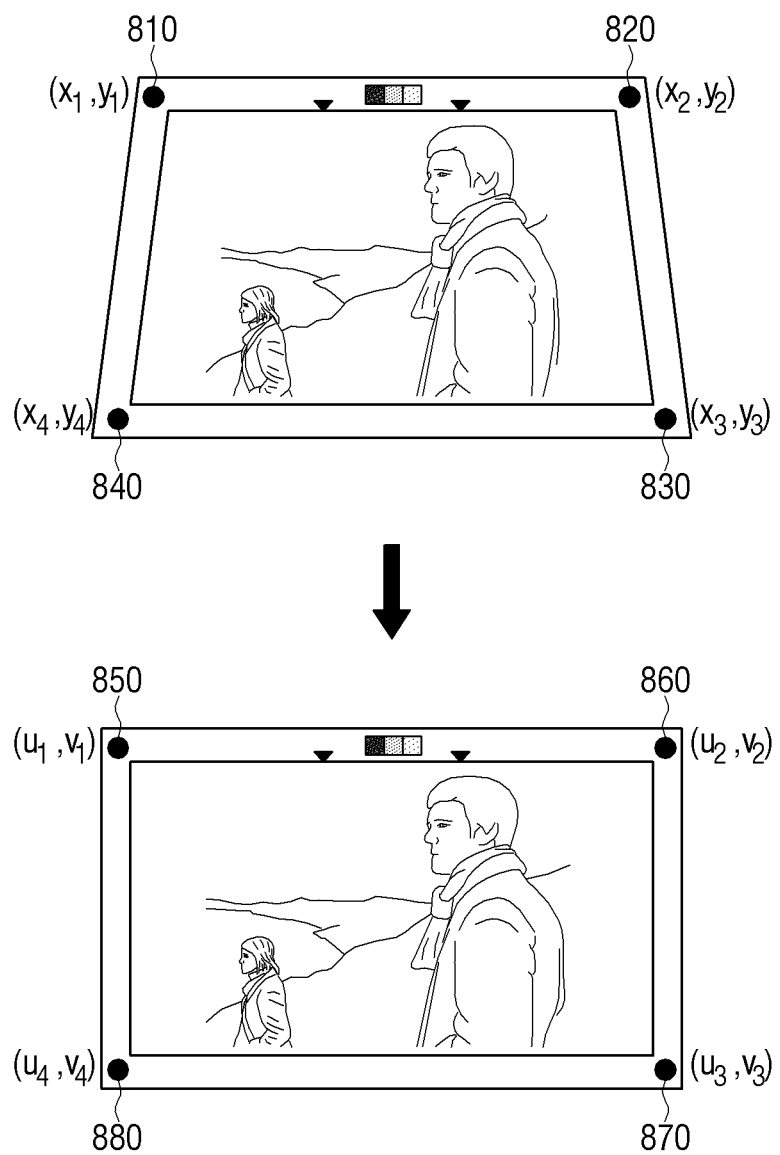

However, if the guide member 510 within the photographed image does not correspond to a shape of the display device 50, the electronic device 100 may process the photographed image so that the guide member 510 corresponds to the shape of the display device 50, and acquire information that relates to the background image by using a background of an area at which the display device 50 is to be positioned within the guide member 510 among the processed image. For example, as illustrated in FIG. 8, when the figure formed by the plurality of marks 810, 820, 830 and 840 has a trapezoidal shape, the electronic device 100 may identify that the guide member 510 within the photographed image does not correspond to the shape of the display device 50. In this case, The electronic device 100 may process an area at which the trapezoidal guide member 510 is located in a rectangular shape with a ratio of 16:9 as illustrated in the lower side of FIG. 8.

In this case, the electronic apparatus 100 may process an image through perspective transformation. For example, the electronic device 100 may convert coordinates of the corners 810, 820, 830 and 840 of the trapezoid illustrated in the upper side of FIG. 8 into those of corners 850, 860, 870 and 880 of the rectangle illustrated in the lower side of FIG. 8 based on the mathematical formula 1 shown below.

$$u_n = \frac{a_{11}x_n + a_{21}y_n + a_{31}}{a_{13}x_n + a_{23}y_n + a_{33}}, \qquad \text{[Mathematical formula 1]}$$
$$v_n = \frac{a_{12}x_n + a_{22}y_n + a_{32}}{a_{13}x_n + a_{23}y_n + a_{33}}$$

Here, a11, a21, a31, a12, a22, a32, a13, a23 and a33 are conversion coefficients.

In addition, the electronic device 100 may acquire a background image by using a background of an area at which the display device 50 is to be positioned within the guide member 510 among the image processed to a rectangle with a ratio of 16:9.

Figure 9:
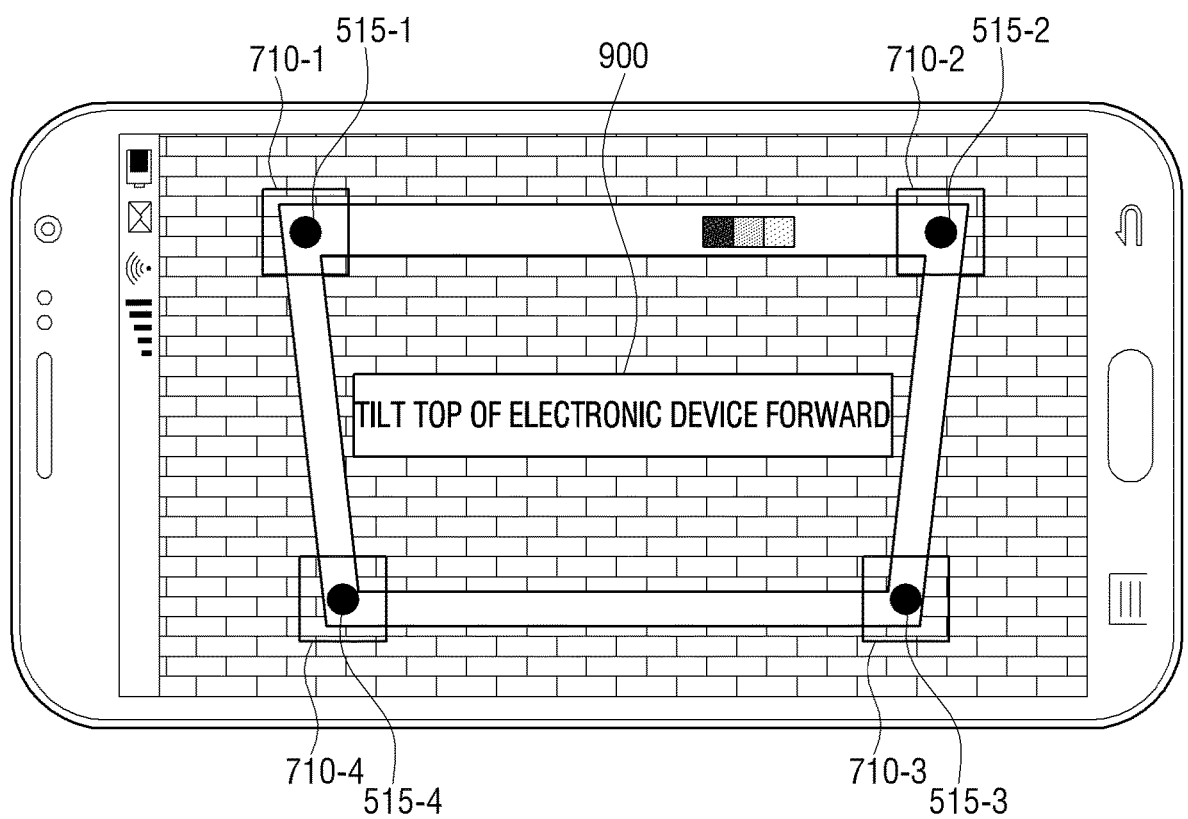

The electronic device 100 may analyze the guide member 510 within the photographed image, and display a guide message 900 for guiding a user motion to the user so that the guide member 510 corresponds to a shape of the display device 50. For example, as illustrated in FIG. 9, when an area at which the guide member 510 is positioned has a trapezoidal shape with a longer upper side, the electronic device 100 may display a guide message 90 for guiding a user motion, "TILT TOP OF ELECTRONIC DEVICE FORWARD."

In addition, when the user moves the electronic device 100 in accordance with the guide message 900, the electronic device 100 may acquire a background image based on a background of an area at which the display device 510 is to be positioned within the guide member 510.

In addition, the electronic device 100 may acquire information for white balance by analyzing a color mark 525 of the guide member 510 among the photographed image. In particular, the electronic device 100 may not acquire an accurate color of an area at which the guide member 510 is positioned due to external light. For example, if the external light is incandescent light, the background image is generally red, and if the external light is fluorescent light, the background image is generally photographed in green. Accordingly, when the background image is photographed under the condition that external light exists, the white balance may be corrected so that white color can be captured.

Accordingly, the electronic device 100 may analyze the color mark 525 of the guide member 510 among the photographed image, and acquire color information of a background of an area at which the display device 50 is positioned within the guide member 510. In addition, the electronic device 100 may acquire white balance correction information for correcting white balance based on the acquired color information.

The electronic device 100 may transmit information that relates to white balance (e.g., color information or white balance correction information) together with information that relates to the background image to the display device 50.

Figure 7D:
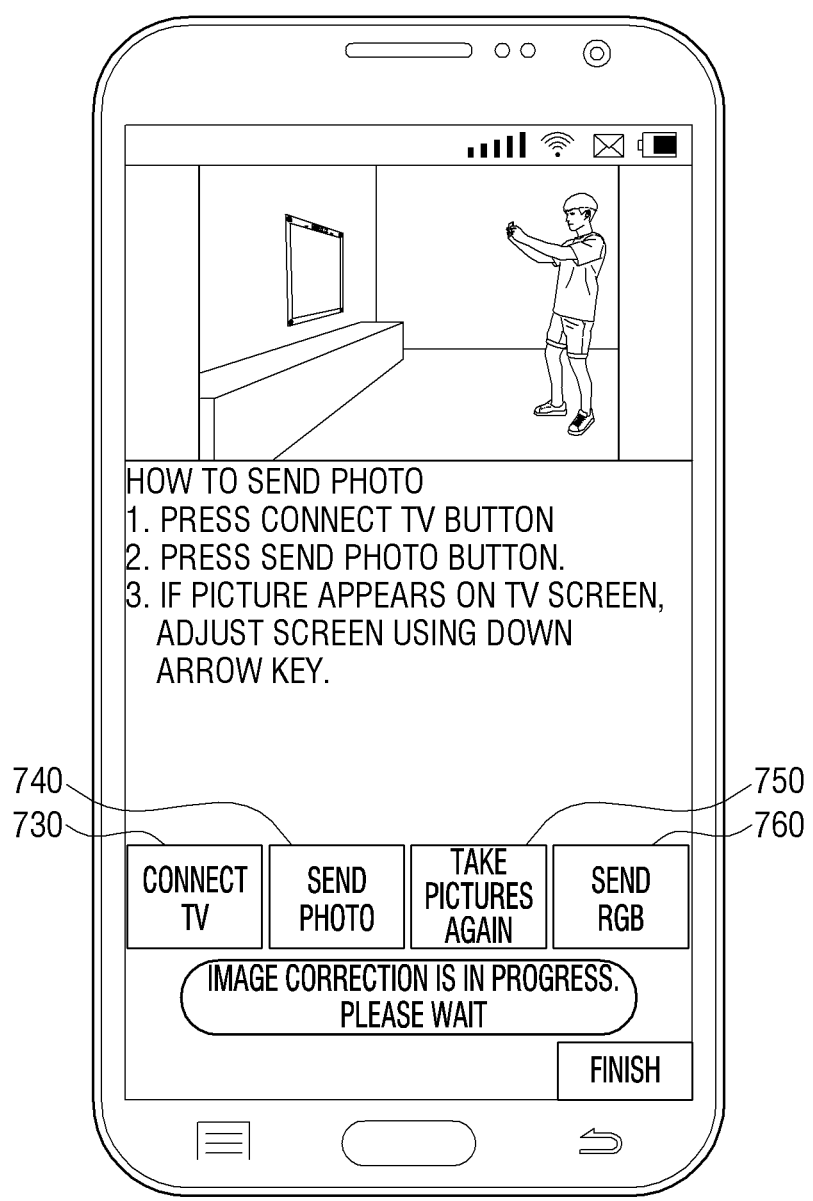

After the background image information and the white balance information is acquired, the electronic device 100 may display a menu screen of an installation application as illustrated in FIG. 7D. In particular, the menu screen may include a first icon 730 for connecting the electronic device 100 to the display device 50, a second icon 750 for rephotographing a background image, and a third icon 750 for sending information for white balance. In particular, in the state that the electronic device 100 and the display device 500 are not connected to each other, when the first icon 730 is selected, the electronic device 100 may connect with the display device 50.

Figure 10:
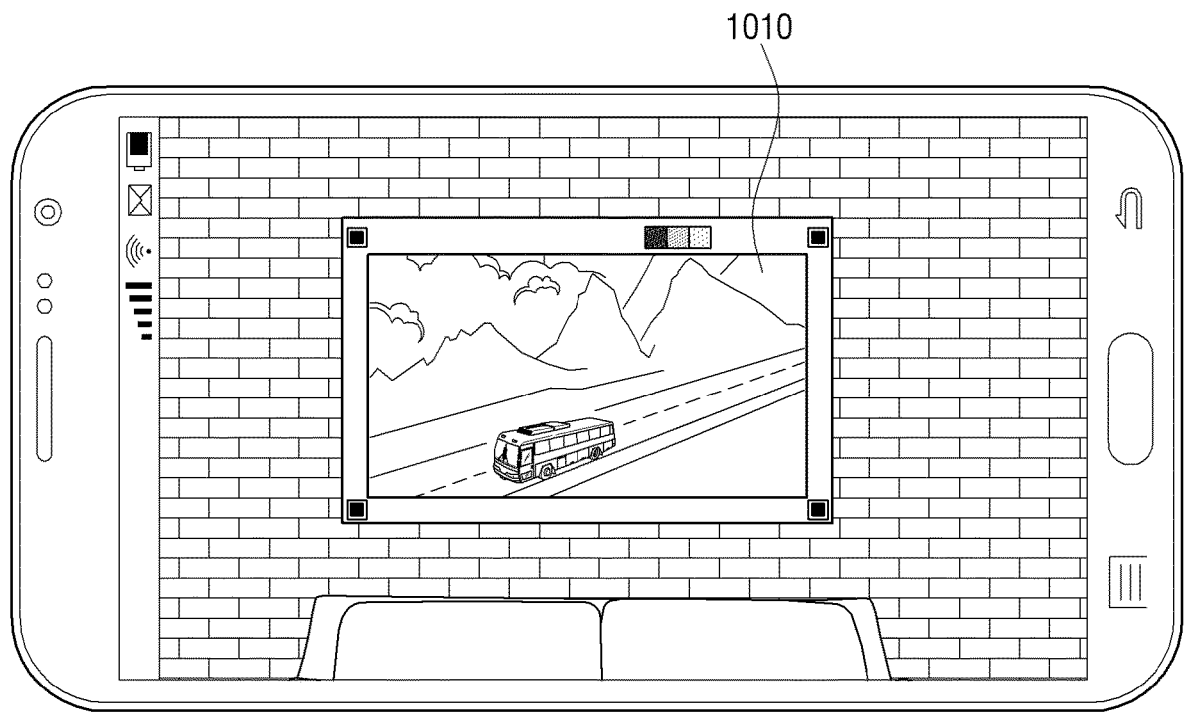

In addition, the electronic device 100 may synthesize an area at which the display device 50 is to be installed within the guide member 510 among the photographed image with a predetermined image, and display it. In particular, as illustrated in FIG. 10, the electronic device 100 may synthesize an area (e.g., an area at which the display device 50 is positioned within the guide member 510) at which the display device 50 is installed among the photographed image with a predetermined image (e.g., broadcast image and the like), and display it. For example, the processor 140 of the electronic device 100 may determine a portion of the photographed image within the guide member 510, and may replace the determined portion with a video image. Accordingly, the user may virtually experience the display device 50 that provides the video image through the electronic device 100.

Figure 11A:
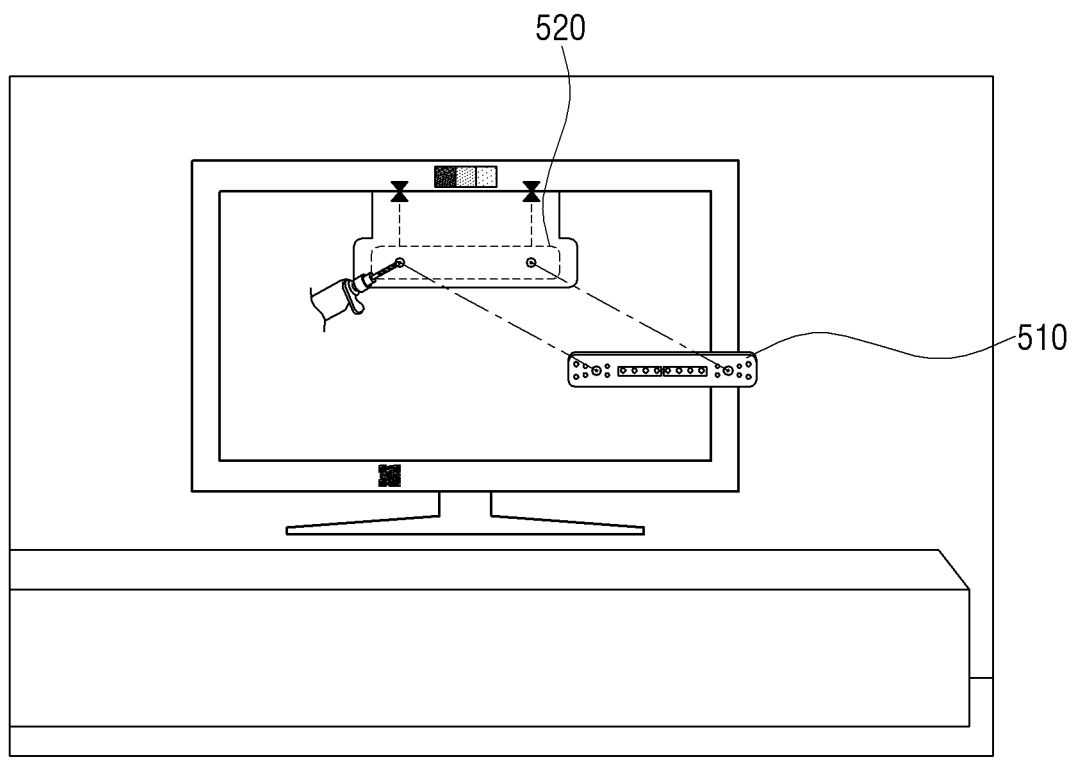

In addition, when the guide member 510 is at a fixed position, the user may connect a member 520 for guiding installation of a wall mount to the guide member 510, and attach it as illustrated in FIG. 11A. In this case, the user may install a wall mount for installing a wall-mounted display device 50 by using the member 520 for guiding installation of the wall mount.

Figure 11B:
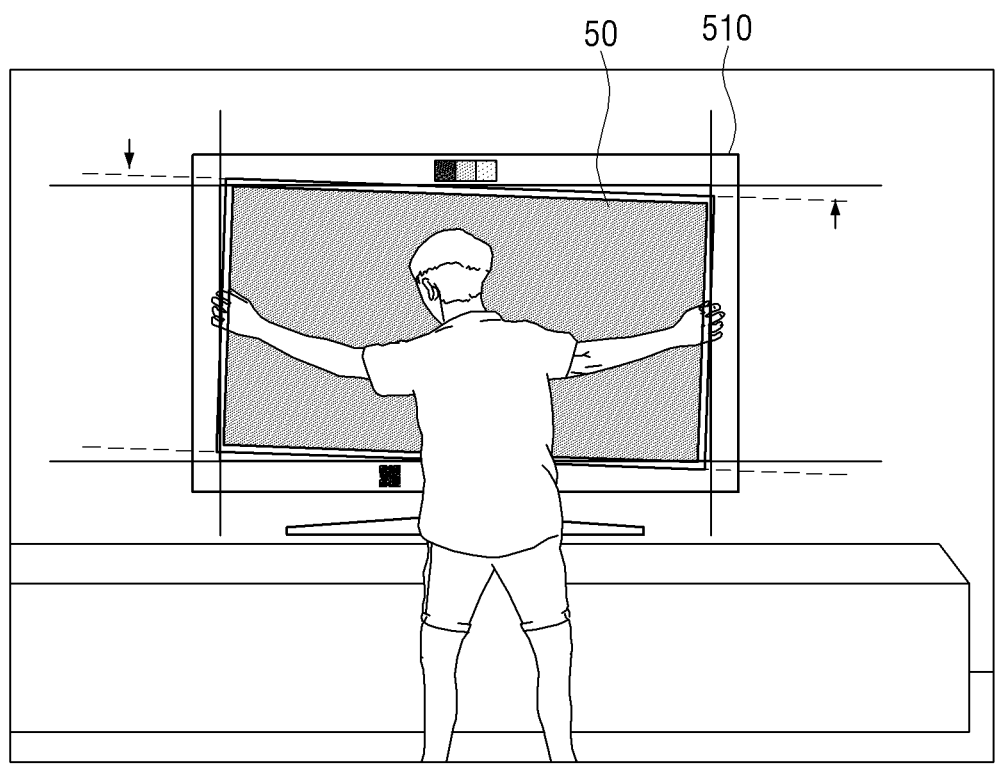
Figure 11C:
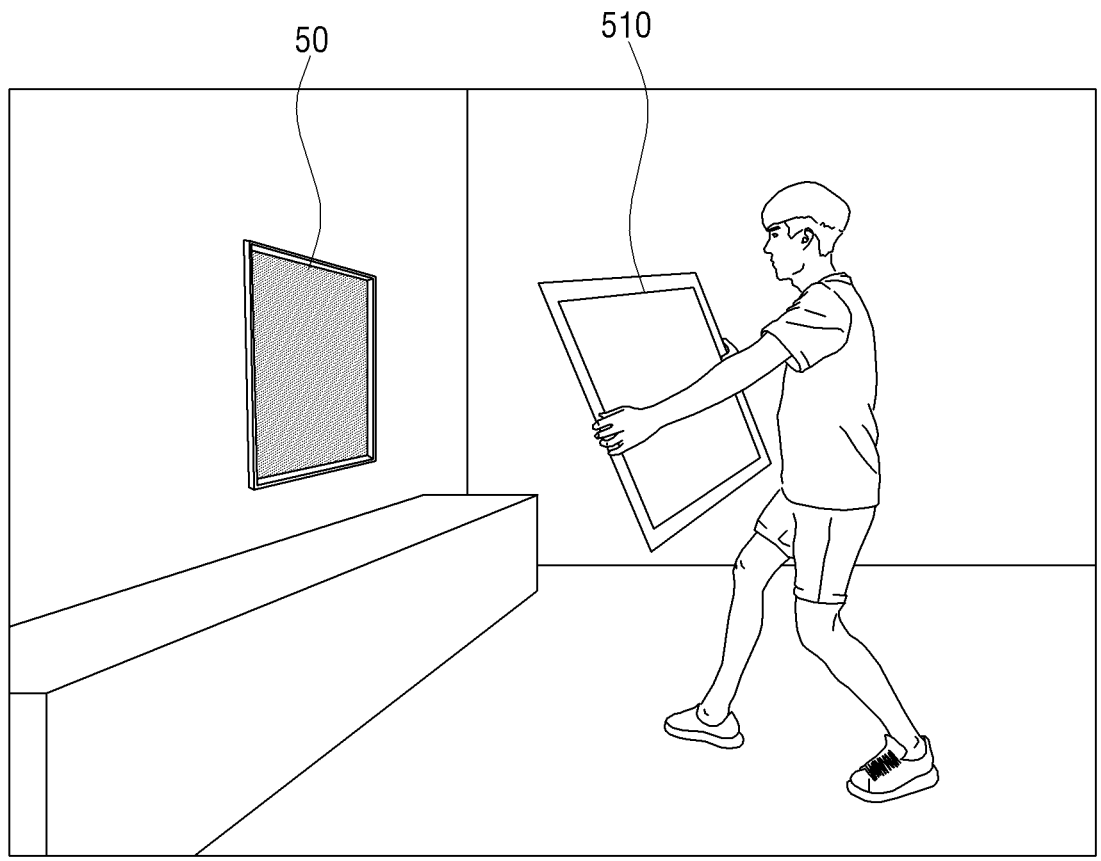

In addition, the user may hold the display device 50 horizontally and fix it by using the guide member 510 and the fixed wall mount as illustrated in FIG. 11B. In addition, the user may remove the guide member 510 from the wall as illustrated in FIG. 11C.

Figure 11D:
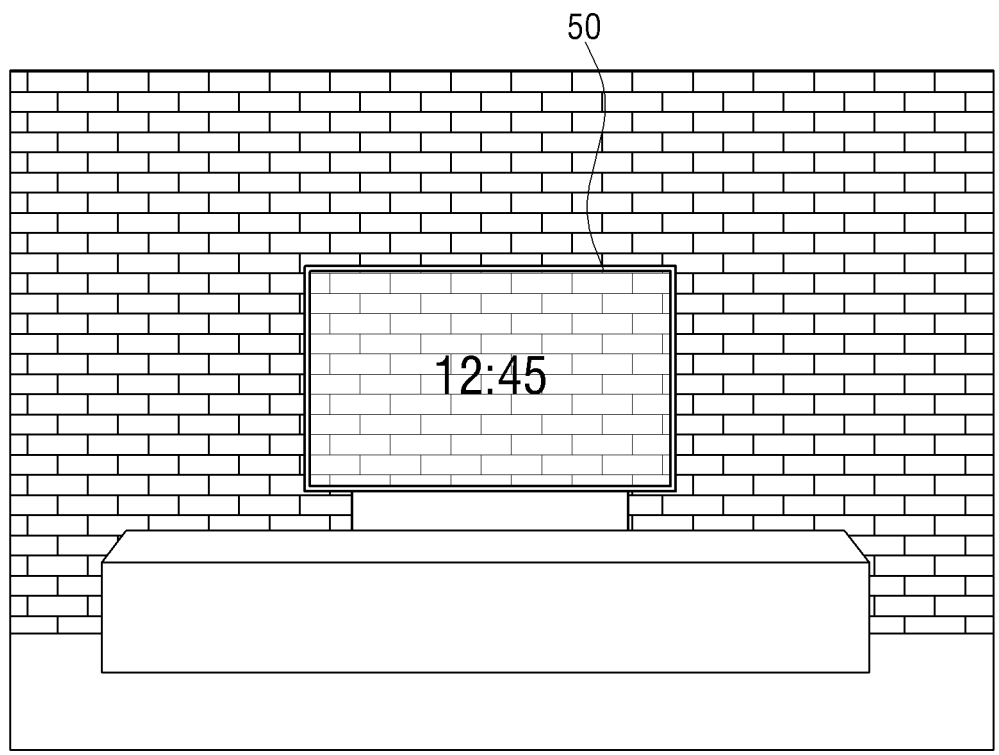

Further, the electronic device 100 may display a background image received from the electronic device 100 as illustrated in FIG. 11D. In this case, the electronic device 100 may display various information (e.g., time information, weather information, and the like) together with the background image. In particular, the electronic device 100 may simultaneously provide a variety of image effects (e.g., shadow effect) to provide the same effect that various information is written to the glass window.

FIG. 12 is a flowchart for explaining the method for controlling the electronic device 100 according to an exemplary embodiment.

First, the electronic device 100 acquires an image that includes a guide member positioned in an area at which the display device 50 is to be installed, at operation S1210. The guide member 510 has a shape corresponding to a shape of the display device 50, and corner areas of the guide member 510 may be provided with a plurality of marks.

Then, the electronic device 100 displays the acquired image at operation S1220. In this case, the electronic device 10 may display a plurality of indicators that guide positions of the marks for guiding an optimal background image.

In addition, the electronic device 100 may analyze a background of an area at which the display device 50 is to be positioned within the guide member 510 among the photographed image, and acquire information that relates to a background image of a position at which the display device 50 is installed, at operation S1230. In particular, when the plurality of marks of the guide member 510 among the photographed image are positioned on the plurality of indicators according to moving of the electronic device 100, the electronic device 100 may analyze an area at which the guide member 510 is positioned among the photographed image, and acquire a background image. In this case, the electronic device 100 may acquire a background image and also information for white balance correction through the color mark 525.

Lastly, the electronic device 100 transmits the information that relates to the background image to the display device 100, at operation S1240.

As described above, according to the various exemplary embodiments, the user may be provided with an optical illusion effect such as a transparent display device without distortion. In addition, the user may install the display device in an exactly desired location so as to provide distortion-free optical illusion effect.

The method of controlling an electronic device according to the above-described various exemplary embodiments may be realized as a program and provided in the user terminal device. In particular, a non-transitory computer readable medium at which a program which implements a method of controlling a terminal device is stored therein may be provided.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing embodiments and advantages are merely example and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to persons having ordinary skill in the art.

What is claimed is:

1. A method for controlling an electronic device, the method comprising:
    acquiring an image comprising a guide member for guiding a position at which a display device is to be placed, wherein the image of the guide member comprises an image of a plurality of marks that are physically located on the guide member;
    displaying the acquired image;
    displaying a plurality of indicators to be laid over the image of the plurality of marks;
    prompting a user to adjust a camera to place the plurality of marks of the guide member within the plurality of indicators, respectively;
    analyzing a background area within the guide member of the acquired image;
    acquiring information about a background image that is to be displayed on the display device based on the background area; and
    displaying, on the display device, the background image based on the information about the background image,
    wherein the guide member is a physical component having a frame-like shape with an empty space therein for acquiring an image of an area behind the display device to be placed at the guided position.

2. The method as claimed in claim 1, wherein a shape of the guide member corresponds to a shape of the display device and the guide member includes the plurality of marks formed in corner areas of the guide member,
    wherein the displaying the plurality of indicators comprises displaying the plurality of indicators that guides positions of the plurality of marks of the guide member, and
    wherein in response to identifying that the plurality of marks of the guide member are positioned at the plurality of indicators in the acquired image, the analyzing the background area of the acquired image is performed.

3. The method as claimed in claim 2, wherein the acquiring the information about the background image comprises:
    identifying whether a shape of the guide member included in the acquired image corresponds to the shape of the display device based on positions and sizes of the plurality of marks included in the acquired image; and
    in response to the shape of the guide member included in the acquired image corresponding to the shape of the display device, performing the acquiring information about the background image based on the background area of the acquired image.

4. The method as claimed in claim 3, wherein the acquiring the information about the background image comprises:
    in response to the shape of the guide member included in the acquired image not corresponding to the shape of the display device, processing the acquired image to render the shape of the guide member in the acquired image to correspond to the shape of the display device; and
    acquiring the information about the background image based on the background area of the acquired image.

5. The method as claimed in claim 3, further comprising:
    in response to the shape of the guide member included in the acquired image not corresponding to the shape of the display device, displaying a guide message that guides a user motion that renders the shape of the guide member in the acquired image to correspond to the shape of the display device.

6. The method as claimed in claim 1, wherein the guide member includes a color mark that includes a plurality of colors for acquiring color information of the acquired image,
    wherein the acquiring the information about the background image comprises acquiring the information by analyzing the color mark of the guide member in the acquired image, and
    wherein the method further comprises adjusting the acquired image based on the information acquired by analyzing the color mark.

7. The method as claimed in claim 1, further comprising:
    replacing a portion of the acquired image that is surrounded by the guide member in the acquired image, with a predetermined image.

8. The method as claimed in claim 1, wherein the guide member includes a Quick Response (QR) code for installing or executing an application that relates to installing the display device,
    wherein the method further comprises:
    in response to the electronic device recognizing the QR code in the acquired image, installing or executing the application.

9. The method as claimed in claim 8, further comprising:
    connecting the electronic device to the display device through the application, and
    transmitting the acquired information of the background image to the display device.

10. An electronic device, comprising:
    a communication interface configured to communicate with a display device;
    a camera configured to acquire an image that comprises a guide member for guiding a position at which the display device is to be placed, wherein the image of the guide member comprises an image of a plurality of marks that are physically located on the guide member;
    a display configured to display the acquired image, and display a plurality of indicators to be laid over the image of the plurality of marks; and
    a processor configured to:
        control the display to prompt a user to adjust the camera to place the plurality of marks of the guide member within the plurality of indicators, respectively,
        analyze a background area within the guide member of the acquired image, and acquire information about a background image that is to be displayed on the display device based on the background area, wherein the display is further configured to display, on the display device, the background image based on the information about the background image, and wherein the guide member is a physical component having a frame-like shape with an empty space therein for acquiring an image of an area behind the display device to be placed at the guided position.

11. The electronic device as claimed in claim 10, wherein a shape of the guide member corresponds to a shape of the display device and the guide member comprises the plurality of marks formed in corner areas of the guide member, and wherein the processor is further configured to control the display to display the plurality of indicators that guide positions of the plurality of marks of the guide members, and in response to the plurality of marks of the guide member being positioned at the plurality of indicators in the acquired image, analyze the background area in the acquired image.

12. The electronic device as claimed in claim 11, wherein the processor is further configured to identify whether a shape of the guide member included in the acquired image corresponds to the shape of the display device based on positions and sizes of the plurality of marks in the acquired image, and in response to the shape of the guide member included in the acquired image corresponding to the shape of the display device, acquire the information about the background image based on the background area of the acquired image.

13. The electronic device as claimed in claim 12, wherein the processor is further configured, in response to the shape of the guide member included in the acquired image not corresponding to the shape of the display device, process the acquired image to render the shape of the guide member in the acquired image to correspond to the shape of the display device, and acquire the information about the background image based on the background area of the acquired image.

14. The electronic device as claimed in claim 12, wherein the processor is further configured to, in response to the shape the guide member included in the acquired image not corresponding to the shape of the display device, control the display to display a guide message that guides a user motion that renders the shape of the guide member in the acquired image to correspond to the shape of the display device.

15. The electronic device as claimed in claim 10, wherein the guide member includes a color mark that includes a plurality of colors for acquiring color information of the acquired image, wherein the processor is further configured to acquire the information about the background image by analyzing the color mark of the guide member in the acquired image, and adjust the acquired image based on the information about the background image acquired by analyzing the color mark.

16. The electronic device as claimed in claim 10, wherein the processor is further configured to control the display to replace a portion of the acquired image that is surrounded by the guide member in the acquired image with a predetermined image.

17. The electronic device as claimed in claim 10, wherein the guide member includes a Quick Response (QR) code for installing or executing an application that relates to installing the display device, and wherein the processor is further configured to, in response to recognizing the QR code within the acquired image, execute or install the application.

18. The electronic device as claimed in claim 17, wherein the processor is further configured to control the communication interface to connect the electronic device to the display device according to a user command that is received through the application and control the communication interface to transmit the acquired information about the background image to the display device.

19. A non-transitory computer readable storage medium storing a program that is executable by a computer to perform a method for controlling an electronic device, the method comprising:

acquiring an image that comprises a guide member for guiding a position at which a display device is to be placed, wherein the image of the guide member comprises an image of a plurality of marks that are physically located on the guide member;

displaying the acquired image;

displaying a plurality of indicators to be laid over the image of the plurality of marks;

prompting a user to adjust a camera to place the plurality of marks of the guide member within the plurality of indicators, respectively;

analyzing a background area within the guide member of the acquired image;

acquiring information about a background image that is to be displayed on the display device based on the background area; and displaying, on the display device, the background image based on the information about the background image, wherein the guide member is a physical component having a frame-like shape with an empty space therein for acquiring an image of an area behind the display device to be placed at the guided position.

* * * * *